United States Patent [19]

Bennett et al.

[11] Patent Number: 4,498,277

[45] Date of Patent: Feb. 12, 1985

[54] METHOD FOR HARVESTING NARROWLY SPACED ROWS OF PLANTS, METHOD FOR CONVERTING CONVENTIONAL APPARATUS FOR SUCH HARVESTING AND APPARATUS FOR SUCH HARVESTING

[75] Inventors: Rodney W. Bennett, Tranquillity; Jerry C. Bennett, Fresno; William C. Bennett, Tranquillity; Charlie Bennett, Avenal, all of Calif.

[73] Assignee: Bennett and Bennett, Tranquillity, Calif.

[21] Appl. No.: 533,921

[22] Filed: Sep. 20, 1983

[51] Int. Cl.³ .............................................. A01D 46/08
[52] U.S. Cl. .............................................. 56/1; 56/28
[58] Field of Search ............ 56/1, DIG. 2, 28, 328 R, 56/327 R, 330, 27.5, 15.5

[56] References Cited

U.S. PATENT DOCUMENTS

| 2,672,001 | 3/1954 | Bopf et al. | 56/15.5 |
| 3,090,183 | 5/1963 | Thomson | 56/13.6 |
| 3,475,886 | 11/1969 | Hart | 56/1 |
| 3,952,487 | 4/1976 | Guibeaud | 56/328 R |
| 4,237,681 | 12/1980 | Zantzinger | 56/27.5 |
| 4,249,365 | 2/1981 | Hubbard et al. | 56/28 |

FOREIGN PATENT DOCUMENTS 886821  12/1981  U.S.S.R. ................. 56/28

*Primary Examiner*—John J. Wilson
*Assistant Examiner*—John G. Weiss
*Attorney, Agent, or Firm*—Huebner & Worrel

[57] ABSTRACT

A method for picking closely spaced rows of plants using a harvesting machine having spindle-type picking heads; a method of modifying a conventional harvesting machine to harvest closely spaced rows of plants; and a harvesting machine having spindle-type picking heads for harvesting closely spaced rows of plants.

9 Claims, 6 Drawing Figures

METHOD FOR HARVESTING NARROWLY SPACED ROWS OF PLANTS, METHOD FOR CONVERTING CONVENTIONAL APPARATUS FOR SUCH HARVESTING AND APPARATUS FOR SUCH HARVESTING

BACKGROUND OF THE INVENTION

1. Field of the Invention

The present invention relates to a method for harvesting and more particularly to a method for harvesting plants aligned in a plurality of substantially parallel rows, the rows being substantially evenly and closely spaced. The invention further relates to a method for converting conventional harvesting apparatus for such harvesting. The invention still further relates to an apparatus for harvesting from closely spaced, substantially parallel rows of plants.

2. Description of the Prior Art

The mechanization of harvesting operations has set certain limits on the varieties of plants which can be harvested, on the spacing of the plants to be harvested and on the time such plants can be harvested. In respect to such crops as cotton, mechanized harvesting has limited the proximity with which adjacent rows of the plants can be planted.

It is well known that the potential yield of cotton from plants grown in a given area is proportionate to the number of rows of plants able to be planted in that area. Thus, it follows that the more closely spaced the rows are, the higher the potential yield will be. However, it is believed that the optimum yield is obtained when the plants are aligned in rows having midlines, or centers, spaced about thirty inches from each other, whereby crowding of plants from adjacent rows is minimized and the unplanted aisles or paths between rows are discernible.

The advantage of closely planted rows of cotton can be fully exploited only if efficient methods for harvesting the cotton are utilized. The need for and use of mechanized harvesters to remove cotton from plants aligned in substantially evenly spaced rows has long been known.

Conventionally, two types of harvesters have been used for such purposes: "stripper" type harvesters and "spindle" type harvesters. While both of these conventional forms of mechanized harvesters perform adequately for their intended purposes, each type suffers drawbacks which limit its applicability in various harvesting situations.

The stripper type harvester can be constructed to pick cotton from rows of plants having midlines spaced as little as thirty inches apart. The more common forms of stripper type harvesters are the brush strippers and finger strippers, both of which are of fairly recent origin. While the use of these stripper type harvesters permits planting of the rows of cotton plants fairly closely to each other, with a concomitant increase in potential yield of cotton per acre, both stripper type harvesters are saddled with several serious limitations in their efficacy for performing their intended tasks.

For instance, the manner in which the brush stripper operates causes each cotton plant virtually completely to be defoliated, thereby picking a substantial portion of green bolls along with mature cotton. Thus, unless the bolls on each cotton plant in a given area evenly and substantially simultaneously mature, the actual yield of usable cotton from the area will be substantially less than the potential yield of the same area.

Another problem encountered with the brush stripper type harvester is that they tend to pick voluminous quantities of unwanted vegetative material, such as bracts, leaves, and small stems, together with the desired cotton. Thus, the subsequent ginning operations required to clean the cotton are made less efficient and more costly.

Another drawback of using the stripper type harvester is that the stripper mechanism has a tendency to jam and cease operation during harvesting of cotton due to the excessive amounts of trash gathered by the stripper mechanism. A related problem encountered with the stripper type harvester is that where rank growth of weeds and the like among the rows and between plants within rows is present, the stripper type harvester must travel very slowly to avoid constant jamming of the stripper mechanisms.

Yet another problem associated with the use of the stripper type harvester is that the stripper mechanisms have a marked tendency to jam and often stop completely when used to pick cotton that is damp from fog, dew or rain. Thus, it has long been known that the stripper type harvesters are beset by numerous drawbacks, and that therefore use of stripper type harvesters is neither the most advantageous nor the most efficient mechanized way to pick cotton.

The spindle type harvester has been known to those in the cotton industry as being a machine suffering few of the limitations presented by the stripper type harvesters. Conventionally, the spindle type harvesters have a frame or carriage borne on three wheels, two of which are deployed in spaced relation for power-driven rotation about a substantially common axis on the front portion of the carriage. The third wheel is mounted on the rear portion of the carriage and is rotatable about a pivotal axis, whereby the third wheel is employed for steering the harvester. A pair of picking heads are borne on the front portion of the carriage, spaced from each other a predetermined distance. The picking heads each have spindles adapted to engage cotton plants and remove cotton therefrom. The picking heads are conventionally spaced to permit the spindles to be brought into engagement with plants in adjacent rows, simultaneously to pick cotton from the plants of those rows.

However, the picking heads of spindle type harvesters have transverse dimensions which limit the degree to which the heads can be brought into proximity with each other, thereby also limiting the potential minimum distance the spindles can be spaced from each other. Thus, the minimum distance by which the rows of cotton plants to be picked by a spindle type harvester can be spaced from each other has heretofore been dictated primarily by the dimensional limitations of the picking heads. Conventionally, cotton plants planted in rows for picking by spindle type harvesters have had to be spaced with the midlines of the rows separated by a minimum of about thirty-eight inches, with a forty inch separation between midlines being more common.

However, spindle type harvesters exhibit few of the drawbacks associated with the stripper type harvesters; that is, the spindle type harvesters pick cotton which is relatively free of unwanted vegetation, immature bolls, and other trash which would have to be removed during the ginning operation. Further, it has been found that cotton which is wet at the time of harvest is more readily picked using a spindle type harvester. However, while the spindle type harvester overcomes many of the disadvantages commonly associated with the stripper type harvester, for the reasons set forth above, it has heretofore been impossible to harvest cotton from rows of plants separated by a distance of less than about thirty-eight inches.

An additional factor adding to the desirability of planting cotton in rows having midlines spaced about thirty inches apart is that other crops such as green beans and milo are commonly spaced similarly; therefore, cultivating, spraying and other implements used for those crops can also be utilized without adjustment on the areas planted with cotton.

Therefore, it has long been known that it would be desirable to have a method for harvesting plants arranged in closely spaced rows, and particularly cotton plants planted in rows separated about thirty inches without simultaneously harvesting large quantities of extraneous materials that contaminate the cotton so harvested. It has further long been known that it would be desirable to have a method of converting a conventional spindle type harvester to enable such machine to harvest cotton from rows spaced more closely than were heretofore harvestable by such conventional machines. Finally, it has been known that it would be desirable to have a spindle type harvester adapted to pick such crops as cotton from rows spaced more closely than heretofore could be harvested by conventional spindle type harvesters.

OBJECTS AND SUMMARY OF THE INVENTION

Therefore, it is an object of the present invention to provide an improved method for harvesting crops from plants arranged in a plurality of substantially parallel rows, and having particular utility in the harvesting of cotton.

Another object is to provide such a method which permits harvesting from rows planted more closely together than has heretofore been possible with prior art harvesters capable of harvesting without the intake of large quantities of trash such as leaves, stems, and the like.

Another object is to provide such a method wherein the harvested crop is substantially free of extraneous matter.

Another object is to provide such a method which is adaptable to permit harvesting from row crops such as cotton without regard to the distance the adjacent rows are spaced from each other.

Another object is to provide such a method having particular utility to the use of spindle type harvesters.

Another object is to provide a method for converting conventional harvesters to enable such harvesters to harvest from rows of plants planted more closely together than heretofore possible using such a harvester.

Another object is to provide such a method which is particularly well suited to converting conventional spindle type cotton harvesters to permit the harvesting of cotton from plants aligned in rows spaced from each other such small distances as thirty inches.

Another object is to provide an apparatus for harvesting such crops as cotton having spaced picking heads adapted to pick cotton simultaneously from two of a plurality of rows wherein adjacent rows are spaced a predetermined relatively small distance from each other.

Another object is to provide such an apparatus which is adapted to pick cotton from plants in two out of a plurality of rows of plants, wherein the plurality of rows of plants are spaced substantially evenly from each other a distance which heretofore precluded the use of such a machine for the harvesting thereof.

Another object is to provide such an apparatus which is adapted to harvest cotton from cotton plants aligned in a plurality of rows substantially evenly spaced from each other and wherein the distance of such spacing between adjacent rows is small, such as thirty inches.

Another object is to provide such an apparatus having portions disposed to contact and ease the apparatus over the plants of the rows during movement therealong so as to harvest the maximum quantity of cotton fiber substantially free of trash while minimizing damage to the plants themselves, both in the rows being picked as well as in adjacent rows.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENTS

Method For Harvesting Narrowly Spaced Rows of Plants

Figure 1:
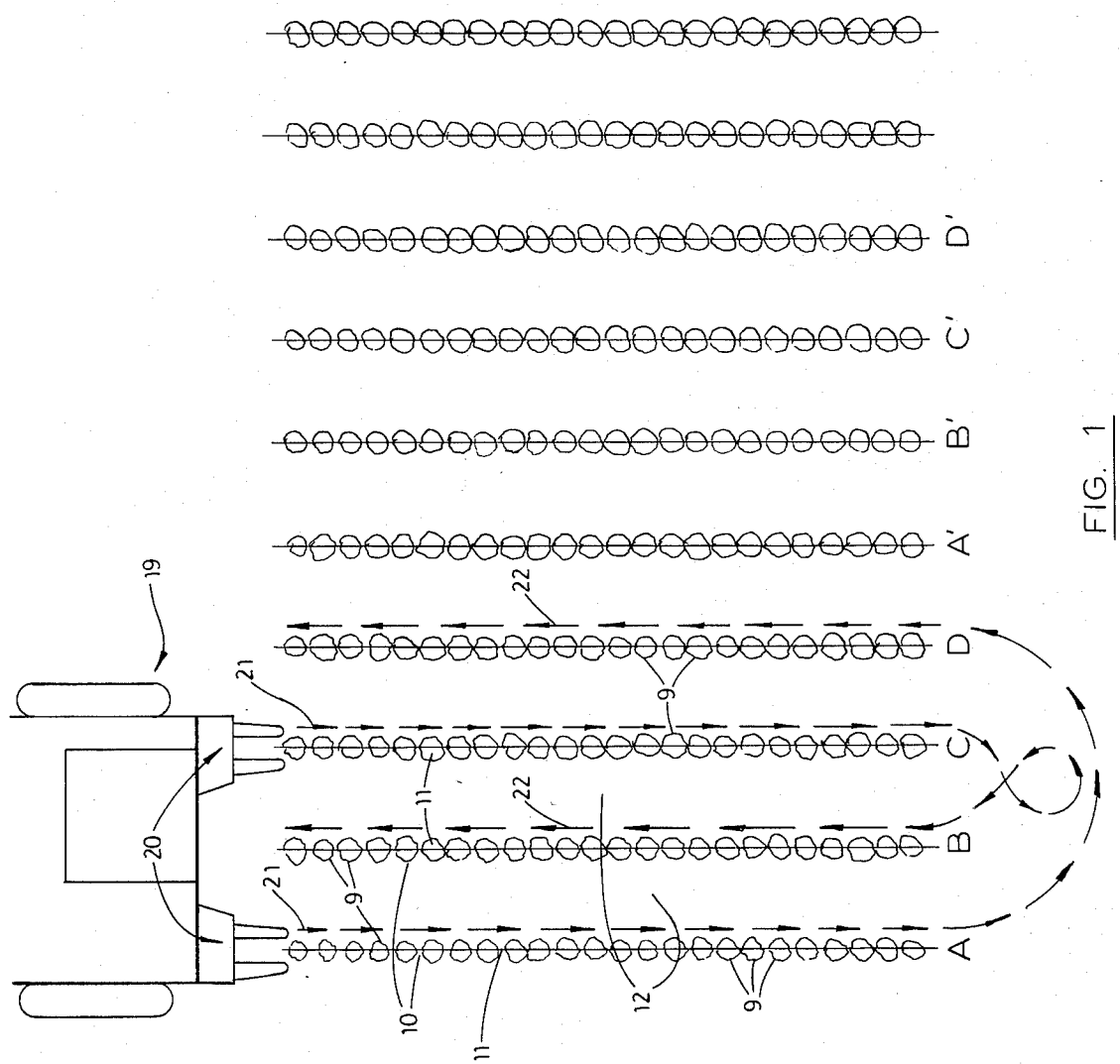
FIG. 1 is a schematic diagram, shown as a top plan view, of a representative field of a row crop and showing the course followed by the apparatus of the present invention in performing a method of the present invention.

Referring more particularly to the drawings, the method of the present invention can be most readily understood by reference to FIG. 1. The method has particular utility in the harvesting of cotton plants grown in rows and, for illustrative convenience, will be described in relation thereto. However, it will become apparent that the method has application to harvesting virtually any row crop.

FIG. 1 is a schematic diagram, shown in top plan view, of a portion of a field in which are planted a plurality of rows of cotton plants 9. As shown therein, the plants are aligned in a plurality of substantially parallel rows 10 having centers, center lines or midlines 11 substantially evenly spaced a predetermined distance from the midlines of their respective adjacent rows. The rows are separated from their respective adjacent rows by aisles or paths 12. The paths are substantially parallel and have midlines substantially evenly spaced from the midlines of their respective adjacent paths a distance substantially equivalent to that by which the midlines of adjacent rows are separated.

In accordance with the preferred embodiment of the method of the present invention, the rows 10 are planted so that the midlines of adjacent rows are spaced substantially thirty inches from each other throughout their lengths. This is substantially closer than the conventional spacing of forty inches required in the use of conventional harvesting methods because of the widths of the picking heads. It will be understood, however, that the method hereof is not limited necessarily to harvesting from rows so spaced.

In the preferred embodiment of the method of the present invention, a harvester having spindle type picking heads is employed in the harvesting operation. In FIG. 1, a mechanical harvester 19 having a pair of spindle type picking heads 20 is shown diagrammatically positioned for passage over and along a pair of rows 10 in the performance of the method hereof. The picking heads have spindle members operable to remove cotton from cotton plants brought into engagement therewith.

In performing the method of the present invention, the picking heads 20 are substantially simultaneously and individually brought into harvesting engagement with the cotton plants 9 of nonadjacent rows 10. As illustrated in FIG. 1, the picking heads 20 are brought into such engagement with nonadjacent rows indicated by the letters "A" and "C" respectively during movement of the harvester along a first path or course 21 indicated by the arrows so marked in FIG. 1. It will be understood that, for illustrative convenience, the arrows are offset from the respective rows A and C, but that the first course travelled by the harvester carries the picking heads over and along rows A and C. The rows A and C are adjacent to and are on opposite sides of the row indicated in FIG. 1 by the letter "B". The picking heads are carried along rows A and C at a substantially even pace, passing as they are so carried on opposite sides of row B and following the first course. The first course is travelled by the harvester until harvesting of rows A and C is complete. At this point, row B has not been harvested, the harvester having passed thereover while the picking heads harvested from rows A and C.

Upon completion of the harvesting of rows A and C, the picking heads 20 are brought into harvesting engagement with the plants 9 of the rows 10, indicated by the letters "B" and "D" adjacent to and on opposite sides of the row 10, indicated in FIG. 1 by the letter "C". The picking heads are carried in such movement along a second path or course 22, indicated by the arrows so marked in FIG. 1. It will be understood that, for illustrative convenience, the arrows are offset relative to the rows B and D, but that the second course travelled by the harvester carries the picking heads over and along rows B and D. The second course is substantially parallel to the first course travelled by the harvester during the harvesting of rows A and C, but, of course in the opposite direction. Upon completion of harvesting of rows B and D, the above sequence is repeated for new rows A' and C', and B' and D', respectively and on corresponding rows 10 thereafter until the desired number of rows have been harvested.

While the foregoing is the preferred embodiment of the method hereof, other embodiments of the method can be employed. For example, in some instances the turning radius required for the harvester 19 may be restricted by the proximity of structures, other crops, or the like. In such cases, harvesting from nonadjacent rows is performed by passing the harvester along courses spaced farther from each other. Thus, upon completion of harvesting of the rows 10 marked A and C, the picking heads 20 can be brought into engagement with the plants 9 of the rows marked A' and C' and carried along such rows for harvesting thereof. Upon completion of this sequence, the picking heads can be brought into harvesting engagement with the plants of the rows marked B and D for harvesting and thereafter be brought into engagement with the plants of rows B' and D'.

Method For Converting Conventional Apparatus For Harvesting From Narrowly Spaced Rows of Plants The method of the present invention for converting conventional apparatus for harvesting from narrowly spaced rows of plants, is in the preferred embodiment directed to modifying or converting a conventional spindle type mechanical cotton harvester for harvesting from narrowly spaced rows of cotton plants 10. As with the method previously described, the method for converting hereof can be employed with respect to crops, and thus harvesters therefor, other than cotton. However, the method has particular utility with respect to cotton harvesters and, more specifically, spindle type cotton harvesters.

Figure 2:
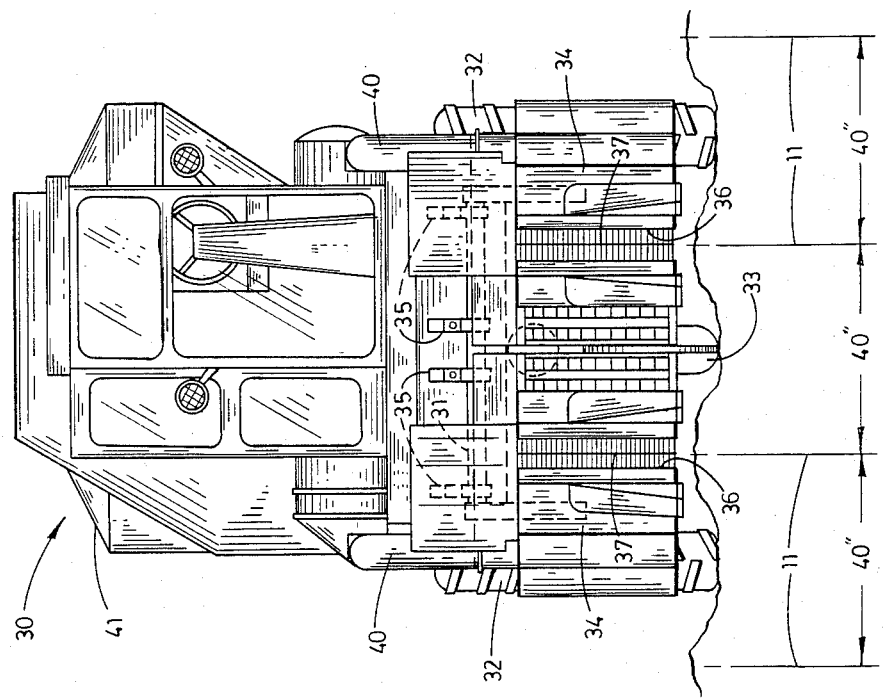
FIG. 2 is a front elevation of a conventional mechanical cotton harvester having spaced, spindle type picking heads and shown in a typical operative environment.

A conventional spindle type cotton harvester, or apparatus, prior to being converted in the practice of the method hereof, is generally designated by the numeral 30 in FIG. 2. The objective in converting the conventional harvester is to permit the use thereof in harvesting cotton from cotton plants 9 aligned in a plurality of substantially parallel rows 10 in the practice of the method for harvesting from narrowly spaced rows of plants heretofore described. The practice of the method for harvesting is not possible with a conventional cotton harvester 30 of the type shown in FIG. 2.

As shown in FIG. 2, the conventional cotton harvester 30 has a frame 31 mounting and borne by a pair of spaced front wheels 32 and a third, rear wheel 33 for earth traversing movement of the cotton harvester along selected paths of travel or courses. The front wheels 32 are connected in driven relation to a drive motor of the cotton harvester, not shown. The rear wheel 33 is mounted for selectively pivotable movement about a substantially vertical axis for steering of the cotton harvester. A pair of picking heads 34 are mounted on the frame 31 in side-by-side relation by mounting arms 35. Each picking head has a plurality of internal spindle members, not shown, operable in the conventional manner to harvest cotton from the cotton plants 9 of a row of cotton plants 10 passing into an entrance 36 of the picking head substantially along a center line or midline 37 thereof. The picking heads 34 of the conventional cotton harvester are spaced from each other a predetermined distance to separate the midlines 37 thereof by a distance roughly equivalent to the conventional distance by which the midlines 11 of adjacent rows of cotton plants 10 are separated. In the conventional cotton harvesters, the transverse dimensions of the picking heads 34 dictate a minimum spatial separation of the midlines 37 of the entrances 36 to be in the range of from about thirty-eight inches to forty inches.

The cotton harvester 30 has a pair of conduits or chutes 40 individually connected in receiving relation to the picking heads 34 to receive cotton removed from the cotton plants 9 by the picking heads. Blowers, not shown, are mounted in communication with the chutes and are operable to create a flow of air through the chutes to carry cotton therethrough. The chutes are connected in delivering relation to a cage or container 41 mounted on the frames 31 whereby cotton carried through the chutes in the airstream created by the blower is delivered to the container for storage and transport thereof during the use of the cotton harvester in the harvesting operation.

In performing the method for converting of the present invention, it will be readily recognized that the steps enumerated hereinafter need not be performed in the order described. Further, the dimensions provided are meant to be illustrative only, as it will be apparent that the method hereof can be employed to modify a conventional cotton harvester of the type described above to harvest cotton from plants planted in rows spaced any of a multiplicity of distances apart.

As previously indicated, the method of the preferred embodiment is directed to such modification as will enable use of the harvester, so modified, to harvest cotton from plants 9 aligned in a plurality of substantially parallel rows 10 having midlines 11 substantially evenly spaced approximately thirty inches from those of their respective adjacent rows. Similarly, the rows are separated from their respective adjacent rows by paths 12 having midlines substantially evenly spaced from the midlines of their respective adjacent paths approximately thirty inches.

In the first step of the method, the picking heads 34 of the cotton harvester 30 are spaced from each other so that the midlines 37 of the entrances 36 thereof are separated a distance equal to the midlines 11 of two nonadjacent rows 10 of the cotton plants 9. In the preferred embodiment, the picking heads 20 are moved to space the midlines 37 approximately sixty inches from each other. This positions the picking heads for picking from two nonadjacent rows of cotton on opposite sides of a single common row of cotton wherein the midlines of adjacent rows of cotton are spaced thirty inches from each other. Such spacing of the picking heads 34 provides an area between the picking heads through which the common row of cotton plants can pass as the cotton harvester 30 is caused to travel along the rows during the harvesting of cotton from the plants. It has been found that the picking heads can relatively simply be disposed in the modified spaced relation described by demounting the conventional mounting arms 35 and then remounting them in such positions as to achieve the spacing of the picking heads previously set forth. The chutes 40 will, in most instances, need to be disconnected from the picking heads prior to such repositioning.

Next, the front wheels 32 of the cotton harvester 30 are spaced farther apart in positions permitting them to ride in paths 12 oppositely laterally disposed with respect to the rows of plants to be harvested by the cotton harvester in the practice of the method for harvesting thereof. To avoid engagement of unharvested cotton plants by the wheels, it is desirable that the front wheels be disposed to travel substantially along the midlines of the paths. Thus, in the illustrative example given, this step includes spacing the front wheels to provide a transverse wheel base of approximately ninety inches.

To avoid destruction or damage to the common row 10 of cotton plants 9 disposed between a selected pair of rows intended to be harvested, the next step in the method consists of replacing the single rear wheel 33 with a pair of rear wheels spaced from each other individually to ride in and along parallel paths 12. Such step also includes individually mounting the rear wheels for rotation about vertical axes for pivotal movement and interconnecting them by a steering linkage, whereby the rear wheels serve the steering function formerly served by the single rear wheel of the conventional cotton harvester. In the preferred embodiment of the method, the pair of rear wheels are spaced to provide a transverse wheel base substantially equal to that of the front wheels, as modified.

The method further includes the step of modifying the chutes 40 as necessary to accommodate the increased lateral displacement of the picking heads 34. This can be accomplished, for example, by reconstructing the existing chutes to provide obliquely disposed and extended sections thereof which individually interconnect the picking heads and the existing chutes. Alternatively, entirely new chutes can be installed operably to interconnect the picking heads and the container 41.

Finally, the method of the preferred embodiment calls for the installation of a deflector assembly on the frame 31 to deflect and thus project plants 9 of the row 10 which passes beneath the harvester 30 without being harvested, from the frame 31, axles, and other components of the harvester, and to prevent entanglement thereby, during the passage of the harvester along a course for picking from the adjacent rows. In the preferred embodiment, the method calls for the installation of a trough-like member having a smooth surfaced channel deployed to receive portions of the plants of the unharvested row in protective relation thereto as the cotton harvester passes therealong while harvesting from the adjacent rows. Such structure also preferably employs a shield deployed beneath the rear axle of the harvester to deflect the plants of the unharvested row away from entanglement by and possible entanglement with the rear axle.

The method for converting heretofore described results in the creation of a cottom harvester substantially identical to the apparatus for harvesting narrowly spaced rows of plants, which will now be described. Reference is invited to the apparatus now to be described in this regard.

Apparatus For Harvesting Narrowly Spaced Rows of Plants

Figure 5:
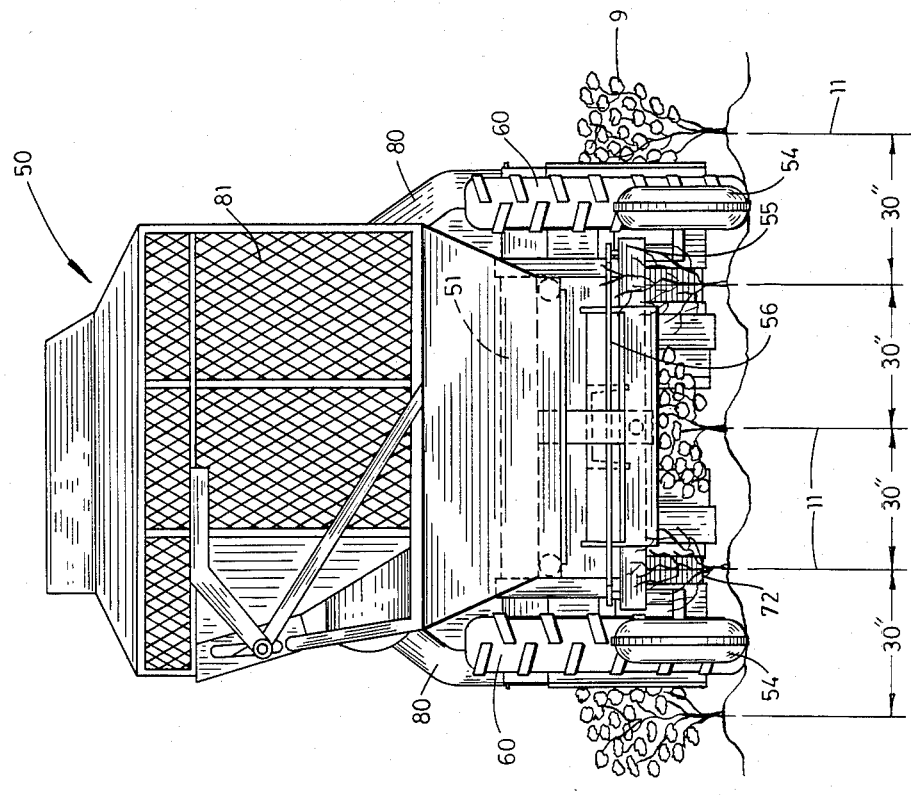
FIG. 5 is a rear elevation of the apparatus of FIG. 3.
Figure 3:
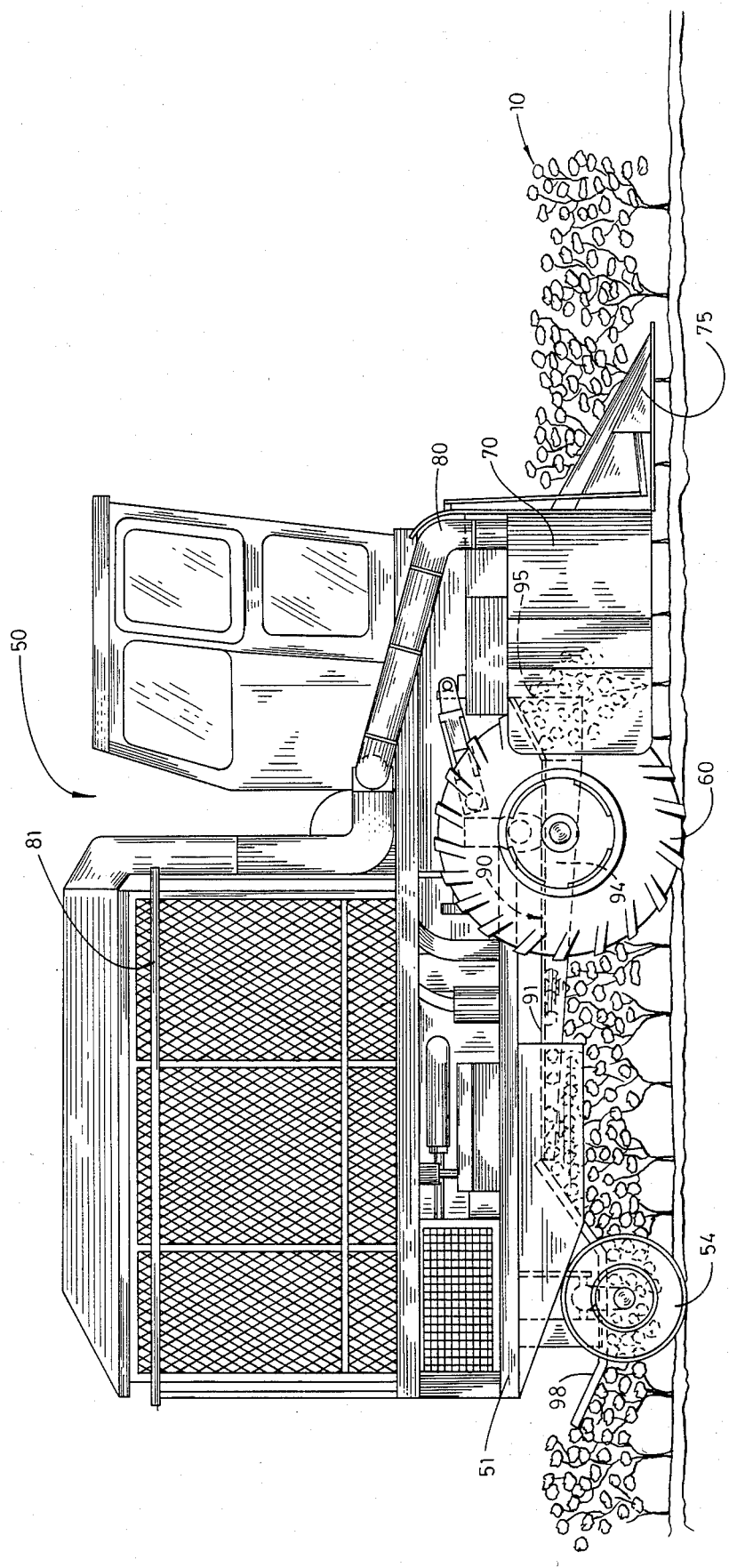
FIG. 3 is a side elevation of the apparatus of the present invention shown in a typical operative environment.
Figure 4:
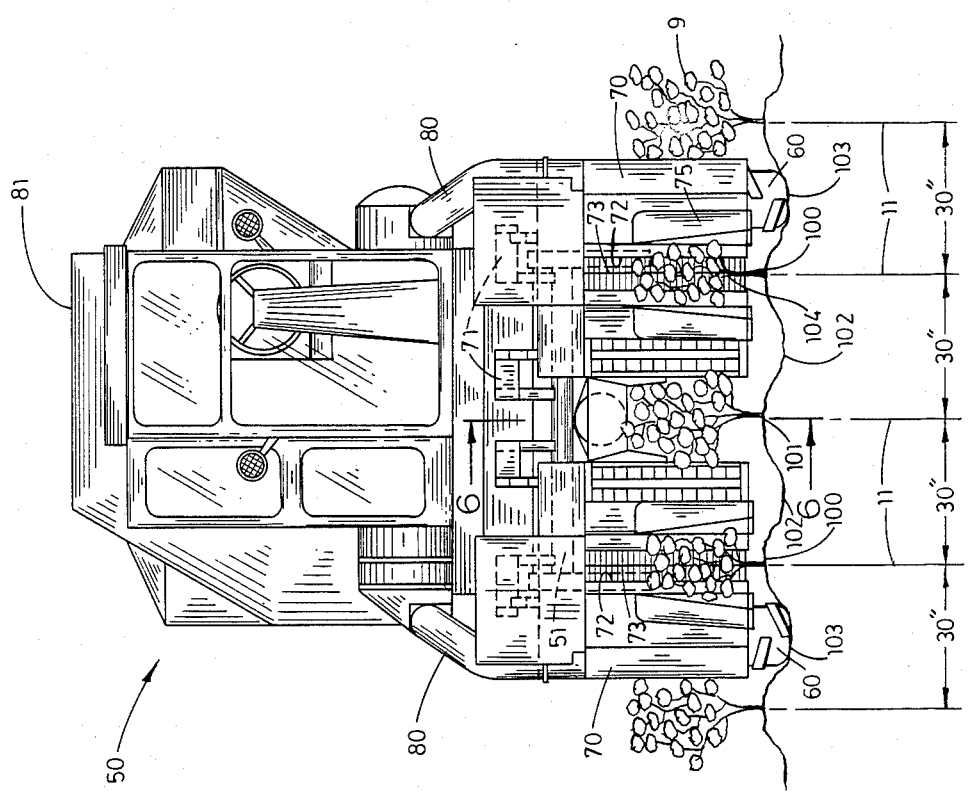
FIG. 4 is a front elevation of the apparatus of FIG. 3.

The apparatus embodying the principles of the present invention is generally indicated by the numeral 50 in FIGS. 3, 4 and 5. As shown therein, the apparatus has a carriage, or frame 51 having a predetermined front portion 52 and a rear portion 53. As can best be seen by reference to FIGS. 3 and 5, a pair of spaced rear wheels 54 are borne by the rear portion 53 of the frame 51. The rear wheels are borne by the frame on an axle assembly 55 so that each wheel of the pair is mounted for rotation about a horizontal axis of rotation. The axle assembly in addition individually mounts the wheels for pivotal movement about individual substantially vertical axes normal to the axes of rotation. The axle assembly further includes a tie rod 56 operable to pivot the rear wheels in unison about their respective vertical axes to provide for steering of the apparatus.

The front portion 52 of the frame 51 mounts a pair of front wheels 60 spaced a predetermined distance from each other and disposed for rotation about a substantially common horizontal axis of rotation. The front wheels 60 are connected in driven relation to a drive motor, not shown, by a transmission 61, shown fragmentarily in FIG. 6. The front wheels are spaced from each other a distance substantially equal to that by which the rear wheels 54 are separated from each other. As can best be seen in FIGS. 4 and 5, this distance of spacing in the preferred embodiment is preferably ninety inches. This permits the front and rear wheels track in the paths 12 between the rows 10 when harvesting from nonadjacent rows on opposite sides of the common, unharvested row wherein adjacent rows are spaced thirty inches from each other.

Borne on the front portion 52 of the frame 51 are a pair of picking heads 70 spaced from each other a predetermined distance. Each picking head is mounted on the front portion of the frame by a pair of mounting arms 71, best shown in FIG. 6. The distance by which the picking heads 70 are spaced from each other is determined primarily by the spatial separation of the rows of cotton plants which are desired to be harvested by the apparatus 50, as is discussed more fully below. Each picking head 70 has an entrance 72 having a center line or midline 73. The picking heads are in the preferred embodiment of the spindle type thus containing a multiplicity of spindle members operable to remove cotton from cotton plants engaged thereby. The picking heads have front surfaces 74 from which project a pair of guide members 75. The guide members of each pair are deployed on opposite sides of the entrance of their respective picking head.

A chute 80 is mounted on each picking head 70 in receiving relation to cottom harvested by that picking head. Each chute has a blower, not shown, operable to create an air flow through the chute from the picking head whereby cotton removed from cotton plants by the picking head is transported along the chute from the picking head. A cage or container 81 is mounted on the frame 51 adjacent to the rear portion 53 of the frame. The distal ends of the chutes are connected in cotton discharging relation to the container. Cotton passed through the chutes by the blowers thereof is caused to travel into the container 81 for storage during operation of the apparatus 50. The container 81 is mounted in a conventional manner on the frame for lateral pivotal movement, whereby cotton deposited therein can be dumped from the container upon such lateral pivotal movement in the conventional manner.

The apparatus 50 is adapted for harvesting cotton from plants aligned in a plurality of substantially parallel rows, the rows having midlines substantially evenly spaced a predetermined distance from each other to provide paths between adjacent rows. The apparatus is so constructed as simultaneously to remove cotton from plants in two nonadjacent rows while the apparatus travels along a path substantially parallel to those rows in the manner already described in relation to the methods of the present invention.

In the preferred embodiment of the apparatus, the picking heads 70 are spaced to permit individual simultaneous engagement by the picking heads with two rows of cotton plants separated by a common row. Thus, the picking heads 70 must be spaced from each other a distance sufficient to dispose the midlines 73 of the entrances 72 of the picking heads about twice the distance separating the midlines of adjacent rows of plants, as can best be visualized in FIG. 4. Therefore, the apparatus with the picking heads spaced to harvest cotton in accordance with the method hereof from rows having center lines or midlines separated by approximately thirty inches, has the picking heads spaced from each other so that the midlines 73 of the entrances 72 are spaced approximately sixty inches from each other.

Further, it is preferable that the front wheels 60 and the rear wheels 54 be spaced, respectively, to permit rolling motion thereof along paths between rows of plants while the picking heads are brought into engagement with plants in the nonadjacent rows. In order to obtain the greatest stability of the apparatus 50, it is preferable that the wheels be deployed to travel in paths outside the rows of plants engaged by the picking heads, as shown in FIG. 4.

Figure 6:
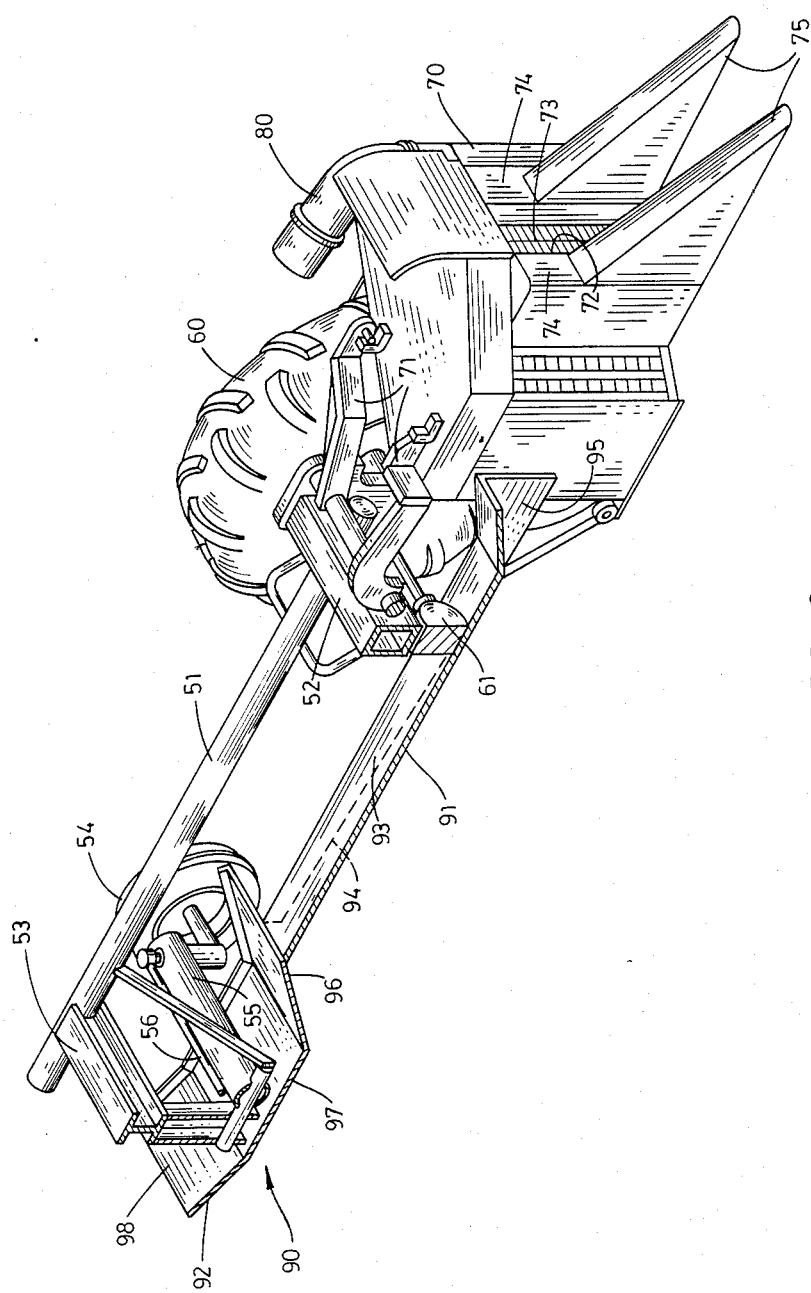
FIG. 6 is a fragmentary perspective view of the apparatus taken on line 6—6 in FIG. 4.

As best seen by reference to FIGS. 3 and 6, a deflector assembly 90 is mounted subjacently on the frame 51. The deflector assembly has a first, trough-like portion 91 mounted on the frame and extending from the front portion 52 of the frame rearwardly toward the rear portion 53. The deflector assembly has a second portion 92 continuous with the first portion 91 and mounted subjacently on the frame extending to the rear portion 53 of the frame.

The first portion 91 of the deflector assembly 90 has a top panel 93 from which depend two side panels 94 to define a channel bounded thereby. The top panel, as shown in FIG. 6, has a forwardly disposed, upwardly oblique portion 95 which is sloped downwardly and rearwardly to form a converging entrance to the channel. The second portion 92 of the deflector assembly 90 can be constructed in a variety of ways. In the preferred embodiment, however, the second portion is deployed in shielding relation to the rear axle assembly 55. The second portion has an upwardly oblique leading panel 96 continuous with the top panel 93 of the first portion 91; a substantially horizontal, central panel 97 continuous with the leading panel 96; and a trailing panel 98 continuous with and upwardly obliquely disposed in relation to the central panel, as can best be seen in FIG. 6.

OPERATION

The operation of the apparatus of the present invention is believed readily apparent, and is briefly summarized at this point.

In performing the harvesting of cotton from cotton plants employing the apparatus 50, the apparatus is positioned to align the entrances 72 of the picking heads 70 with two nonadjacent rows of cotton plants 100 adjacent to a common row 101, as can best be seen in FIG. 4. The apparatus is driven to bring the picking heads individually, simultaneously into engagement with the plants of the rows as the front wheels 60 and rear wheels 54 are aligned to travel along the paths 102 between the rows 100 and the paths remotely adjacent thereto.

The apparatus 50 is driven along a course over the rows 100 to be harvested, whereby cotton on the plants 104 of said rows is removed therefrom by the picking heads.

As the apparatus 50 travels along the course, the picking heads 70 pass on opposite sides of the common row 101, leaving the cotton of the plants thereof intact and unharvested. The plants of the common row enter, in movement relative to the apparatus, the entrance of the first portion 91 of the deflector assembly 90. Portions of the plants are engaged by the top panel 93 of the first portion 91 and the side panels 94 thereof and are deflected away from the other portions of the apparatus to prevent engagement of the plants thereby.

Further movement of the apparatus 50 brings the second portion 92 of the deflector assembly 90 into contact with the plants. The plants are first contacted by the leading panel 96 and bent downwardly or deflected thereby. Subsequently, the plants are contacted by and passed, in movement relative to the apparatus, below the central panel 97 and are then released from confinement by the deflector assembly by contact with the trailing panel 98.

It has been found that the cotton plants possess a natural resiliency and are left substantially free of injury by the deflection thereof by the deflector assembly.

It will readily be seen that the present invention provides an apparatus capable of harvesting cotton from rows spaced from each other by a distance heretofore incapable of being harvested by a conventional spindle type harvester. Further, the present invention allows the harvesting of cotton from relatively narrowly spaced rows, an advantageous characteristic of the conventional stripper machines, while permitting the harvesting of cotton substantially free of unwanted debris and extraneous vegetation, a desirable attribute of conventional spindle type harvesters.

The apparatus of the present invention can be constructed in a number of different forms for various picking situations. For example, the picking heads can be positioned relative to each other to permit use of the apparatus in harvesting rows of plants having narrower or broader spacings than thirty inches. Further, the frame can be constructed so that all portions of the apparatus which pass over the common unharvested row are substantially higher above the earth surface than heretofore described, thus obviating the need for the inclusion of the deflector assembly. Still further, the mounting arms 71 can be pivotally mounted on the frame, the picking heads, or both, to enable selective adjustment of the spacing of the picking heads to harvest rows of cotton plants aligned in a variety of spaced dispositions without the need to disassemble the apparatus.

Therefore, the method for harvesting narrowly spaced rows of plants, the method for converting conventional apparatus for such harvesting and the apparatus for such harvesting, all of the present invention, provide an efficient, practical and thoroughly dependable means for harvesting narrowly spaced rows of plants not heretofore available.

Although the invention has been shown and described in what is conceived to be the most practical and preferred methods and apparatus, it is recognized that departures may be made therefrom within the scope of the invention, which is not to be limited to the illustrative details disclosed.

Having described our invention, what we claim as new and desire to secure by Letters Patent is:

1. A method for harvesting cotton from plants aligned in a plurality of substantially parallel rows, the method comprising traversing at least three of said rows in substantially continuous movement along a course substantially parallel to said rows; and substantially simultaneously harvesting the cotton from the plants of at least two of said rows traversed which are spaced from each other by at least one of said rows traversed from which cotton is not harvested.

2. The method of claim 1 wherein cotton is harvested during the harvesting step from two nonadjacent rows separated from each other by one of said rows.

3. The method of claim 1 wherein the traversing step is performed in a first direction of travel and the method includes:
a second traversing step traversing at least three of said rows in a second direction of travel opposite to said first direction of travel and wherein the rows traversed in the second traversing step are the row not harvested in the first harvesting step, one of the rows harvested in the first harvesting step and a row not traversed in the first traversing step; and a second harvesting step including harvesting from the row not harvested in the first harvesting step and from the row not traversed in the first traversing step.

4. The method of claim 1 including substantially simultaneously with the traversing and harvesting steps protecting the row not harvested so as substantially to avoid the removal of cotton therefrom.

5. The method of claim 4 wherein the protecting step includes deflecting of the plants in said row away from contact which might inadvertently cause such removal of cotton.

6. A method for converting a conventional apparatus of the type adapted to harvest cotton from plants grown in a first field arrangement in a plurality of substantially parallel rows, each having a line of reference and the lines of reference of adjacent rows spaced from each other a predetermined distance to define a path therebetween, said conventional apparatus having a frame with predetermined front and rear portions; a pair of front wheels rotatable about a substantially common axis of rotation mounted on the front portion in supporting relation thereto and spaced from each other a predetermined distance to permit rolling motion thereof along paths adjacent to a common path therebetween; a rear wheel mounted on the rear portion of the frame in supporting relation thereto for rolling motion thereof along said common path as the pair of wheels move along said adjacent paths; a pair of picking heads borne by the front portion of the frame, each picking head operable to harvest cotton from a row of cotton plants, the picking heads being spaced from each other a predetermined distance for simultaneous harvesting of rows adjacent to the common path; a receptacle carried on the frame and adapted to receive cotton so harvested; and means for conveying cotton from the picking heads to the receptacle; the method of the invention for converting said conventional apparatus for the harvesting of cotton from plants grown in a second field arrangement in a plurality of substantially parallel rows, each having a line of reference and the lines of reference of adjacent rows spaced from each other a distance less than said predetermined distance of said first field arrangement, the method comprising:
  A. deploying the picking heads in positions on the front portion of the frame spaced laterally from each other a distance such as to enable the picking heads individually to harvest cotton from plants in nonadjacent rows in said second field arrangement;
  B. moving the front wheels laterally from each other a distance sufficient to permit rolling motion thereof along paths separated by at least two adjacent paths in said second field arrangement;
  C. replacing the rear wheel with a pair of rear wheels mounted on the rear portion of the frame in supporting relation thereto with said rear wheels of the pair spaced from each other for rolling motion in individual trailing relation to said front wheels; and D. mounting a deflector on the underside of the frame of the conventional apparatus facing downwardly and disposed substantially midway between and extending rearwardly from the picking heads with respect to the direction of travel of the apparatus for protecting the plants of the common row from the apparatus during movement thereover.

7. An apparatus for harvesting plants grown in a plurality of substantially parallel rows wherein adjacent rows are spaced from each other a predetermined distance, the apparatus comprising:

a frame having predetermined front and rear portion and subjacent surfaces;

wheels borne on the frame for earth traversing movement thereof along selected courses relative to said parallel rows;

a pair of picking heads mounted on the front portion of the frame adapted to be brought into engagement with cotton plants and to remove cotton therefrom, the picking heads of said pair mounted on the front portion of the frame spaced from each other for substantially simultaneously engaging plants in nonadjacent rows and harvesting the cotton therefrom during movement of the apparatus therealong, the picking heads spaced from each other a distance sufficient for the picking heads to pass on opposite sides of a common row to harvest cotton from the plants of rows adjacent to and on opposite sides of said common row;

means borne by the frame for receiving and containing cotton removed by the picking heads;

means for conveying cotton from the picking heads to the receiving means; and a deflector assembly mounted on the subjacent surfaces for isolating the cotton plants of the common row from the subjacent surfaces of the apparatus during said movement of the apparatus, said deflector assembly having a first portion shaped to form an inverted trough contacted by the cotton plants of said common row during said movement substantially to isolate said cotton plants from the remainder of the apparatus substantially to prevent inadvertent removal of cotton therefrom.

8. The apparatus of claim 7 wherein said deflector assembly has a second portion forming a substantially convex, downwardly facing surface to ease the cotton plants of said common row beneath the rear portion of the frame.

9. An apparatus for harvesting plants grown in a plurality of substantially parallel rows wherein adjacent rows are spaced from each other a predetermined distance, the apparatus comprising:

a frame having predetermined front and rear portion;

wheels borne on the frame for earth traversing movement thereof along selected courses relative to said parallel rows;

a pair of picking heads mounted on the front portion of the frame adapted to be brought into engagement with cotton plants and to remove cotton therefrom, the picking heads of said pair being mounted on the front portion of the frame spaced from each other for substantially simultaneously engaging plants in nonadjacent rows and harvesting the cotton therefrom during movement of the apparatus therealong and wherein the picking heads have entrances having center lines of reference spaced about sixty inches from each other to permit the apparatus to harvest cotton from the cotton plants of said nonadjacent rows and not from said common row where said rows have center lines of reference substantially equally spaced such that the center lines of reference of adjacent rows are about thirty inches apart;

means borne by the frame for receiving and containing cotton removed by the picking heads; and means for conveying cotton from the picking heads to the receiving means.

* * * * *

UNITED STATES PATENT AND TRADEMARK OFFICE
CERTIFICATE OF CORRECTION

PATENT NO. : 4,498,277

DATED : February 12, 1985

INVENTOR(S) : Rodney W. Bennett, William C. Bennett, Jerry C. Bennett and Charlie Bennett It is certified that error appears in the above-identified patent and that said Letters Patent is hereby corrected as shown below:

Column 2, Line 64, delete "boils" and substitute ---bolls---;

Column 13, Line 14, delete "portion" and substitute

---portions---;

Column 13, Line 22, between "pair" and "mounted", insert

---being---;

Column 14, Line 15, delete "portion" and substitute

---portions---.

Signed and Sealed this

Eleventh Day of June 1985

[SEAL]

Attest:

DONALD J. QUIGG

Attesting Officer     Acting Commissioner of Patents and Trademarks